(12) United States Patent
Jung et al.

(10) Patent No.: US 9,051,474 B2
(45) Date of Patent: Jun. 9, 2015

(54) ANTI-GLARE COATING COMPOSITION AND ANTI-GLARE COATING FILM HAVING SUPERIOR ABRASION RESISTANCE AND CONTAMINATION RESISTANCE

(75) Inventors: Soon Hwa Jung, Daejeon (KR); Sung Su Kim, Chungcheongbuk-do (KR); Young Jun Hong, Daejeon (KR); Kyungki Hong, Chungcheongbuk-do (KR); Yeongrae Chang, Daejeon (KR); Soo Kyoung Lee, Chungcheongbuk-do (KR); Joon Koo Kang, Daejeon (KR); Sang Hyuk Im, Daejeon (KR); Jae Pil Koo, Daejeon (KR); Eun Sang Yoo, Chungcheongbuk-do (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/703,882

(22) PCT Filed: Jul. 13, 2011

(86) PCT No.: PCT/KR2011/005161
§ 371 (c)(1),
(2), (4) Date: Dec. 12, 2012

(87) PCT Pub. No.: WO2012/008757
PCT Pub. Date: Jan. 19, 2012

(65) Prior Publication Data
US 2013/0090403 A1    Apr. 11, 2013

(30) Foreign Application Priority Data

Jul. 14, 2010  (KR) .................. 10-2010-0068037
Jul. 13, 2011  (KR) .................. 10-2011-0069559

(51) Int. Cl.
| | |
|---|---|
| *G03G 9/097* | (2006.01) |
| *C08B 37/00* | (2006.01) |
| *G03F 7/031* | (2006.01) |
| *C08F 2/46* | (2006.01) |
| *C08F 2/50* | (2006.01) |
| *B29C 71/04* | (2006.01) |
| *A61L 2/08* | (2006.01) |
| *A61L 24/00* | (2006.01) |
| *C08G 61/04* | (2006.01) |
| *C09D 5/00* | (2006.01) |
| *G02B 1/11* | (2006.01) |
| *G02B 1/10* | (2006.01) |
| *C09D 4/06* | (2006.01) |
| *C09D 201/04* | (2006.01) |
| *G02B 5/02* | (2006.01) |
| *G02B 27/00* | (2006.01) |
| *C08F 220/22* | (2006.01) |

(52) U.S. Cl.
CPC .. *C09D 5/00* (2013.01); *G02B 1/11* (2013.01); *C08F 220/22* (2013.01); *G02B 1/111* (2013.01); *G02B 1/105* (2013.01); *C09D 5/006* (2013.01); *C09D 4/06* (2013.01); *C09D 201/04* (2013.01); *G02B 5/0221* (2013.01); *G02B 5/0294* (2013.01); *G02B 27/0006* (2013.01)

(58) Field of Classification Search
USPC ............... 522/11, 7, 6, 71, 1, 189, 184; 520/1
See application file for complete search history.

(56) References Cited

U.S. PATENT DOCUMENTS

| | | | |
|---|---|---|---|
| 2007/0048509 A1* | 3/2007 | Yoneyama et al. | 428/212 |
| 2010/0238558 A1* | 9/2010 | Im et al. | 359/599 |
| 2010/0304113 A1 | 12/2010 | Chang et al. | |

FOREIGN PATENT DOCUMENTS

| | | |
|---|---|---|
| CN | 101679825 A | 3/2010 |
| JP | 1995-016940 A | 1/1995 |
| JP | 2007-70395 A | 3/2007 |
| KR | 2008-0090779 A | 10/2008 |
| KR | 2008-0101801 A | 11/2008 |
| KR | 2008-0108755 A | 12/2008 |
| KR | WO 2009/069974 * | 6/2009 |
| KR | 2010-0077798 A | 7/2010 |
| KR | 2009-0056913 A | 7/2011 |
| TW | 200906998 A | 2/2009 |
| TW | 200932848 A | 8/2009 |
| WO | 2009069974 A2 | 6/2009 |

OTHER PUBLICATIONS

Written Opinion of the International Search Report from PCT/KR2011/005161.
Office Action from Taiwanese Patent Office Appl'n No. 100124957 dated Mar. 3, 2014.

* cited by examiner

*Primary Examiner* — Ling Choi
*Assistant Examiner* — Jessica E Whiteley
(74) *Attorney, Agent, or Firm* — McKenna Long & Aldridge LLP

(57) ABSTRACT

An exemplary embodiment of the present invention relates to an anti-glare coating composition and anti-glare coating film having excellent abrasion resistance and contamination resistance. The anti-glare coating composition according to the exemplary embodiment of the present invention comprises a) a binder resin; b) a fluorine-based UV curable functional group-containing compound; c) a photoinitiator; d) a surface curable photoinitiator; and e) a particulate of which a surface has an uneven pattern. In the case where a film is formed by using the anti-glare coating composition according to the exemplary embodiment of the present invention, it is possible to provide both abrasion resistance and contamination resistance by a single coating method, to maintain characteristics of abrasion resistance and contamination resistance when the film is rubbed, and to decrease and easily remove contamination by an oil component, such as a fingerprint mark.

12 Claims, No Drawings

ANTI-GLARE COATING COMPOSITION AND ANTI-GLARE COATING FILM HAVING SUPERIOR ABRASION RESISTANCE AND CONTAMINATION RESISTANCE

This application is a national stage application of PCT/KR2011/005161, filed Jul. 13, 2011, which claims priority from Korean patent Applications Nos. 10-2010-0068037, filed on Jul. 14, 2010, and 10-2011-0069559, filed on Jul. 13, 2011, in the Korean Intellectual Property Office, the disclosure of which are incorporated herein by reference in their entirety.

TECHNICAL FIELD

The present invention relates to a coating composition and a coating film that can be applied to displays such as TV, a monitor for computer, a notebook, and a mobile phone. More particularly, the present invention relates to an anti-glare coating composition and an anti-glare coating film that has excellent abrasion resistance and easily remove contamination of oil components such as a fingerprint or a scribble.

BACKGROUND ART

In the case of various displays, there are problems in that an image is easily distorted by a fingerprint or appearance quality is poor. In addition, in the case where a known general surface treatment agent is used, since contamination such as the fingerprint is not easily removed but spreads, seriousness thereof becomes large.

In the related art, a method for implementing surface treatment providing contamination resistance has been proposed as follows.

A first method is a method for introducing a hydrophobic fluorine-based or silicon-based surfactant to an abrasion resistance coating solution, in which contamination resistance is provided to the film by disposing the hydrophobic surfactant on the surface of the film after the coating and curing. In this case, since the hydrophobic surfactant is not bonded to a binder of the coating layer, if the contamination resistance characteristic is measured after the surface is rubbed by a patch several hundred times, there is a disadvantage in that a characteristic thereof is rapidly decreased. In addition, in order to ensure a desirable level of contamination resistance characteristic, an excessive amount of surfactant should be added, and in this case, there is a disadvantage in that abrasion resistance is decreased.

In a second method, a coating layer for providing contamination resistance is separately formed on an abrasion resistance coating layer in a 2 times coating manner. Japanese Unexamined Patent Application Publication No. 07-16940 discloses a method for separately coating a copolymer of acrylate and silica having a perfluoro group on a low refractive layer in which a main component is silica. The above method has an effect in which the contamination resistance characteristic is continued in rubbing of the surface of the film, but to this end, there is a limit in that a bond group that can be reacted with a material of the contamination resistance layer should exist on the abrasion resistance coating layer, and there is a problem in that since the film is manufactured in a 2 times coating manner, a manufacturing cost is increased. In addition, in the case where oil components such as fingerprints are continuously stained, oil permeates the film, such that it is impossible to improve a problem of rapidly decreasing a film characteristic.

DISCLOSURE

Technical Problem

The present invention has been made in an effort to provide an anti-glare coating composition and an anti-glare coating film which can simultaneously provide abrasion resistance and contamination resistance by a single coating method, maintain characteristics of abrasion resistance and contamination resistance when the film is rubbed, and decrease and easily remove contamination by an oil component, such as a fingerprint mark.

Technical Solution

An exemplary embodiment of the present invention provides an anti-glare coating composition, comprising: a) a binder resin; b) a fluorine-based UV curable functional group-containing compound; c) a photoinitiator; d) a surface curable photoinitiator; and e) a particulate of which a surface has an uneven pattern.

Another exemplary embodiment of the present invention provides an anti-glare coating film, that is manufactured by using the anti-glare coating composition according to the exemplary embodiment of the present invention, comprising: a) a binder resin; b) a fluorine-based UV curable functional group-containing compound; c) a photoinitiator; d) a surface curable photoinitiator; and e) a particulate of which a surface has an uneven pattern.

Yet another exemplary embodiment of the present invention provides a method for manufacturing an anti-glare coating film, comprising: coating the anti-glare coating composition according to the exemplary embodiment of the present invention on a substrate; and drying and photocuring the coated anti-glare coating composition.

Still another exemplary embodiment of the present invention provides a display device comprising the anti-glare coating film according to the exemplary embodiment of the present invention.

Advantageous Effects

According to exemplary embodiments of the present invention, in the case where a film is formed by using the anti-glare coating composition according to the exemplary embodiment of the present invention, it is possible to simultaneously provide abrasion resistance and contamination resistance by a single coating method, to maintain characteristics of abrasion resistance and contamination resistance when the film is rubbed, and to decrease and easily remove contamination by an oil component, such as a fingerprint mark.

Best Mode

Hereinafter, the present invention will be described in detail.

A coating composition according to an exemplary embodiment of the present invention comprises a) a binder resin; b) a fluorine-based UV curable functional group-containing compound; c) a photoinitiator; d) a surface curable photoinitiator; and e) a particulate of which a surface has an uneven pattern.

In the coating composition according to the exemplary embodiment of the present invention, as a) the binder resin, a UV curable functional group-containing binder resin may be used.

The UV curable functional group-containing binder resin is a component that is useful to decrease and remove contamination by the oil component such as a fingerprint mark.

As the UV curable functional group-containing binder resin, multifunctional or monofunctional monomers or oligomers are comprised. In the binder, a crosslinking density should be high in order to improve abrasion resistance, but since a problem such as cracks or attachment defects according to a curing shrinkage of the coating film may be accompanied, an appropriate control is required.

A kind of the functional group that can be comprised in the UV curable functional group-containing binder resin is not particularly limited if it is UV curable, and in detail, acrylates, methacrylates, vinyls, or the like may be used.

As the acrylates, there are dipentaerythritol hexaacrylate, pentaerythritol tetraacrylate, pentaerythritol triacrylate, trimethylenepropyltriacrylate, ethyleneglycol diacrylate, hexanediol diacrylate, ethylacrylate, ethylhexylacrylate or butyl acrylate, hydroxyethyl acrylate, and the like and the acrylate-based oligomer may be used.

As the acrylate-based oligomer, a urethane modified acrylate oligomer, an epoxy acrylate oligomer or an etheracrylate oligomer is appropriate, and the number of acrylate functional groups is appropriately 2 to 6. In this case, the molecular weight of the oligomer is appropriately 1,000 to 10,000.

As the methacrylates, there are trimethylolpropanetrimethacrylate, ethyleneglycol dimethacrylate, butanediol dimethacrylate, hexaethyl methacrylate or butyl methacrylate, and the methacrylate-based oligomer may be used.

As the vinyls, there are divinyl benzene, styrene or paramethylstyrene.

In the coating composition according to the exemplary embodiment of the present invention, b) the fluorine-based UV curable functional group-containing compound is a component providing contamination resistance and should have fluorine, and is not particularly limited if the compound has a UV curable functional group.

In detail, acrylate, methacrylate, and vinyls comprising the perfluoro group may be used. In this case, the fluorine-based UV curable functional group-containing compound may have 1 to 6 UV curable functional groups. In detail, the fluorine-based UV curable functional group-containing compound may be selected from the compounds that are represented by the following Formulas 1 to 9, but the scope of the exemplary embodiment of the present invention is not limited thereto, and any material that has a UV curable functional group and comprises a fluorine group may be applied.

[Formula 1]

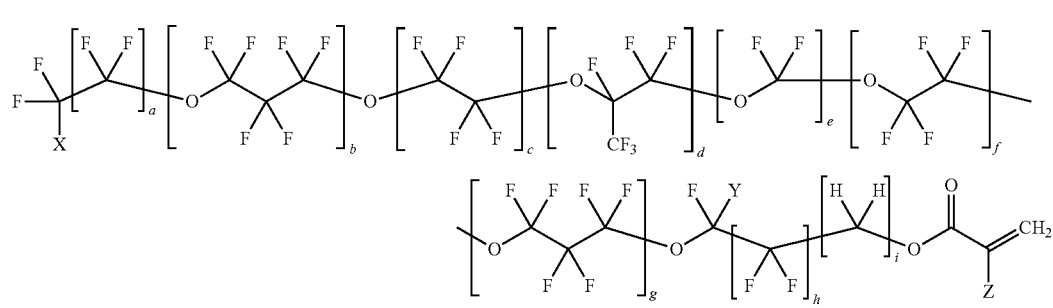

[Formula 2]

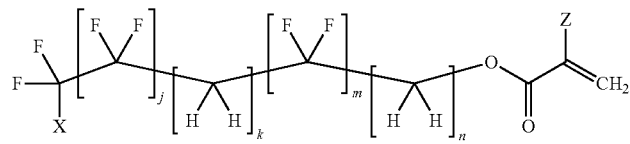

[Formula 3]

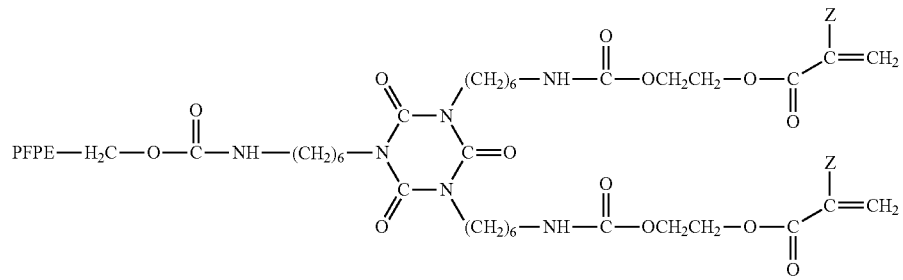

[Formula 4]

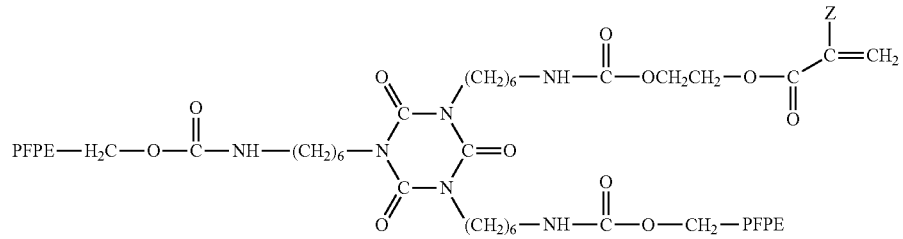

-continued
[Formula 5]
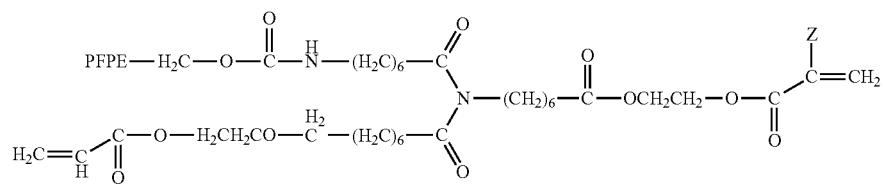
[Formula 6]
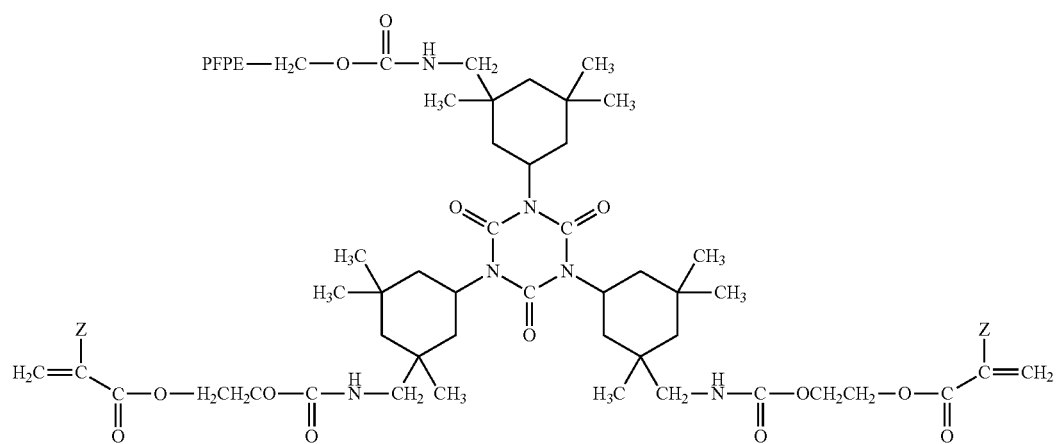
[Formula 7]
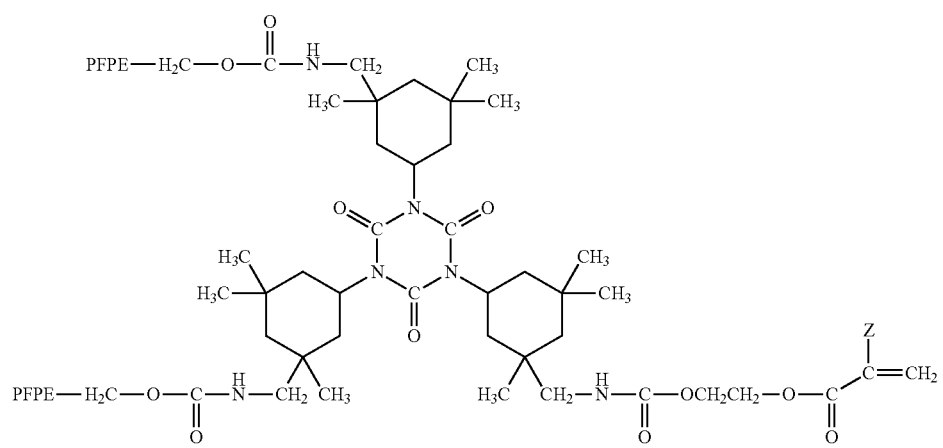
[Formula 8]
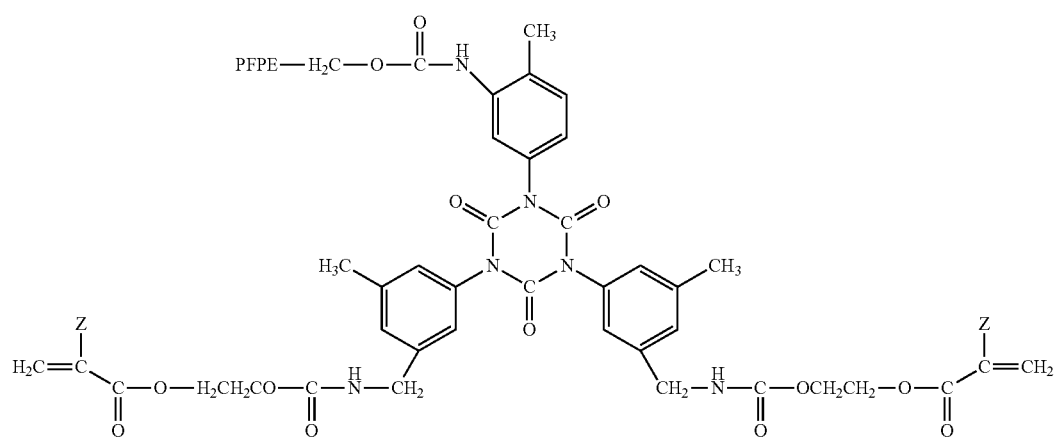

-continued

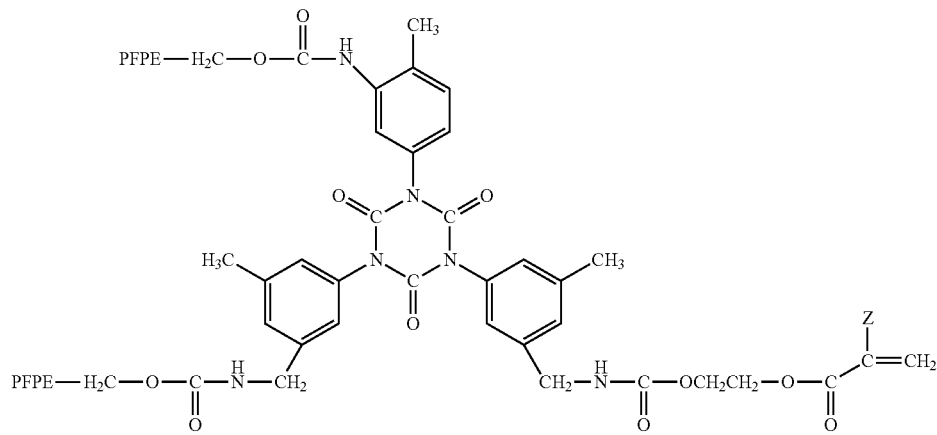

[Formula 9]

In Formulas 1 to 9, X and Y are each independently F or CF₃, Z is H or CH₃, a, j and m are each an integer of 1 to 16, c, k and n are each an integer of 0 to 5, b, d, e, f and g are each an integer of 0 to 200, h and i are each an integer of 0 to 16, and PFPE has the following structures,

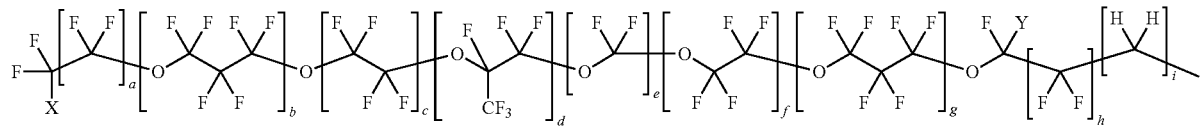

wherein a to i are the same as the definitions of Formula 1.

The content of b) the fluorine-based UV curable functional group-containing compound is preferably 1 to 50 parts by weight and more preferably 20 to 40 parts by weight on the basis of 100 parts by weight of a) the UV curable functional group-containing binder resin. In the case where the content of b) the fluorine-based UV curable functional group-containing compound is less than 1 part by weight, it is not easy to implement abrasion resistance, and in the case where the content is more than 50 parts by weight, the abrasion resistance may be decreased.

In the coating composition according to the exemplary embodiment of the present invention, c) the photoinitiator is not particularly limited if the photoinitiator is an initiator that can be decomposed by UV. As detailed examples thereof, Igacure 184, Darocure 1173, Igacure 2959, Igacure 369 of alpha-aminoketones, Igacure 379, Igacure 1300, Igacure 651 that is benzyldimethylketal or Darocure TPO that is monoacylphosphine manufactured by Ciba-Geigy Co., Ltd. may be used.

The content of c) the photoinitiator is preferably 1 to 20 parts by weight and more preferably 3 to 10 parts by weight on the basis of 100 parts by weight of the UV curable functional group-containing binder resin. In the case where the content of c) the photoinitiator is less than 1 part by weight, a curing speed is low, such that it may not be easy to implement abrasion resistance, and in the case where the content is more than 20 parts by weight, a crosslinking density becomes low, such that abrasion resistance may be decreased.

In the coating composition according to the exemplary embodiment of the present invention, d) the surface curable photoinitiator is an initiator that is not hindered by oxygen radicals generated in photocuring and serves to improve the degree of curing of the surface. As d) the surface curable photoinitiator, alpha-hydroxyketones may be used, and as detailed examples thereof, Igacure 127 and Igacure 907 of alpha-hydroxyketones manufactured by Ciba-Geigy Co., Ltd. may be used.

d) the surface curable photoinitiator is preferably 5 to 40 parts by weight and more preferably 10 to 30 parts by weight on the basis of 100 parts by weight of b) the fluorine-based UV curable functional group-containing compound. In the case where the content of d) the surface curable photoinitiator is less than 5 parts by weight, an effect thereof may be insignificant, and in the case where the content is more than 40 parts by weight, the crosslinking density is decreased, such that the abrasion resistance may be decreased.

In general, since the fluorine-based resin has a property of alignment to the surface by a surface energy difference, the resin is disposed on the surface of the film. Accordingly, an increase in curing efficiency on the surface is a very important characteristic. Since it is impossible to control the degree of curing of the surface by a general photoinitiator, when the surface curable photoinitiator that is not hindered by oxygen is introduced, the degree of curing of the fluorine-based resin is increased, such that abrasion resistance and contamination resistance may be induced.

Accordingly, in the exemplary embodiment of the present invention, c) the photoinitiator and d) the surface curable photoinitiator are used together, and c) the photoinitiator improves strength and hardness of the entire coating film, and d) the surface curable photoinitiator controls the degree of curing of the surface, such that it is possible to maintain hardness, abrasion resistance, and contamination resistance of the entire film.

In the coating composition according to the exemplary embodiment of the present invention, e) the particulate is a component for providing an anti-glare function to the film while being mixed with other components of the coating composition according to the exemplary embodiment of the present invention, and an uneven pattern is formed on the surface of the particulate.

The average particle diameter of the particulate of which the surface has the uneven pattern may be 1 to 10 μm. In the case where the average particle diameter is less than 1 μm, a contrast ratio may be decreased due to a milky haze, and in the case where the diameter is more than 10 μm, the number of internal fillers is decreased, and an internal scattering effect is decreased, such that it may be difficult to obtain a sufficient haze value.

The height of the unevenness of the particulate, of which the surface has the uneven pattern, may be 0.01 to 2 μm, and the width of the unevenness may be 0.01 to 4 μm.

Herein, the height of the unevenness is a distance from the lowest point of the recess portion to the highest point of the protrusion portion, and the width of the unevenness is a distance between the recess portions.

In the case where the height of the unevenness is less than 0.01 μm, or the width is less than 0.01 μm, the size of the unevenness formed by the organic particulate is small, such that a scattering effect may be insignificant and an anti-glare improving effect may be insignificant.

In the case where the height of the unevenness is more than 2 μm, or the width thereof is more than 4 μm, the distinctness-of-image to anti-glaring may be decreased.

The total distribution of the unevenness formed on the surface of the particulate may be 10 to 100% of the entire surface of the organic particulate.

Herein, in the case where the entire distribution ratio of the unevenness is less than 10%, the effective number of unevenness for implementing the anti-glare improving effect is small, such that it may be difficult to implement a substantial anti-glare effect.

The average surface roughness ([Rz]) of e) the particulate, of which the surface has the uneven pattern, may be 0.1 to 2 μm.

Herein, in the case where the average surface roughness is less than 0.1 μm, a scattering effect is insignificant, such that an anti-glare improving effect may be decreased, and in the case where the average surface roughness is more than 2 μm, the distinctness-of-image to anti-glaring may be decreased.

In e) the particulate, of which the surface has the uneven pattern, as a method for forming the uneven pattern, all methods for forming a uneven pattern known in the art may be applied. In detail, it is possible to control the unevenness through a phase separation method, and a shape and a distribution of the unevenness may be controlled through thermodynamic and kinetic controls, but are not limited thereto.

A difference between refractive indexes of e) the particulate of the surface has the uneven pattern and a) the binder resin may be 0.01 to 0.3.

In the case where the difference between the refractive indexes is less than 0.01, the haze value by internal scattering may not sufficiently implemented, and in the case where the difference is more than 0.3, the haze value by the internal scattering is increased, but permeability is decreased, such that the contrast ratio may be decreased.

e) the particulate of which the surface has the uneven pattern may be formed of one single substance selected from polystyrene, polymethylmethacrylate, polymethylacrylate, polyacrylate, polyacrylate-co-styrene, polymethylacrylate-co-styrene, polymethylmethacrylate-co-styrene, polycarbonate, polyvinyl chloride, polybutyleneterephthalate, polyethyleneterephthalate, polyamides, polyimides, polysulfone, polyphenylene oxide, polyacetal, epoxy resin, phenol resin, silicon resin, melamine resin, benzoguamine, polydivinylbenzene, polydivinylbenzene-co-styrene, polydivinylbenzene-co-acrylate, polydiallylphthalate, and triallylisocyanurate polymer, or two or more copolymers thereof.

In addition, e) the particulate of which the surface has the uneven pattern may be surface treated with a material selected from a silane coupling agent, an epoxy compound, a hydroxyl group-containing compound, an isocyanate compound, and other dispersing agents in order to improve compatibility with a) the binder resin and dispersibility of particles.

e) the particulate of which the surface has the uneven pattern is preferably 0.5 to 50 parts by weight and more preferably 0.5 to 20 parts by weight on the basis of 100 parts by weight of the UV curable functional group-containing binder resin. In the case where the content of e) the particulate is less than 0.5 parts by weight, scribble resistance may be decreased, and in the case where the content is more than 50 parts by weight, contamination resistance may be decreased.

The anti-glare coating composition according to the exemplary embodiment of the present invention may further comprise a solvent for a coating property in addition to the above components. The kind or content of the solvent is not particularly limited, but the solvent may be used in the content of preferably 10 to 1,000 parts by weight and more preferably 100 to 500 parts by weight on the basis of 100 parts by weight of the UV curable functional group-containing binder resin for the coating property.

As the solvent, alcohol, alkane, ether, and cycloalkane or aromatic organic solvents may be used, and in detail, methanol, ethanol, isopropyl alcohol, butanol, ethyleneglycol, diacetonealcohol, 2-ethoxyethaneol, 2-methoxyethaneol, 2-butoxyethanol, propylene glycol monomethylether, hexane, heptane, cyclohexane, acetyl acetone, dimethylketone, methylethylketone, methylisobutylketone, toluene, benzene, xylene, methyl acetate, ethyl acetate, butalacetate, dimethylformamide, tetrahydrofurane, or the like may be used, but the scope of the exemplary embodiment of the present invention is not limited thereto.

The anti-glare coating composition according to the exemplary embodiment of the present invention may be coated on the substrate. The substrate is not particularly limited, but a plastic film may be used. As the kind of the film, there are polyester, triacetylcellulose, an olefin copolymer, and polymethylmethacrylate.

The anti-glare coating composition may be coated on the substrate by a generally known coating method, a kind thereof comprises 2 roll reverse coating, 3 roll reverse coating, gravure coating, microgravure coating, die coating, curtain coating, bar coating, dip coating, and flow coating.

The film that is coated by the above method may be cured in the UV irradiation amount of 0.05 to 2 J/cm$^2$ after drying, and in particular, in the case where the curing is performed under the nitrogen atmosphere, the degree of curing of the surface is increased, such that fingerprint removability may be improved.

The coating thickness of the anti-glare coating composition is preferably 0.5 to 300 μm and more preferably 10 to 300 μm. As the coating thickness is increased, abrasion resistance is improved, but a curling phenomenon or cracks of the film according to the curing shrinkage may occur.

Meanwhile, an anti-glare coating film according to the exemplary embodiment of the present invention may be manufactured by using the anti-glare coating composition according to the exemplary embodiment of the present invention and may comprise a) a binder resin; b) a fluorine-based UV curable functional group-containing compound; c) a photoinitiator; d) a surface curable photoinitiator; and e) a particulate of which a surface has an uneven pattern. Needless to say, all the description in the above exemplary embodiment is applied.

Since the anti-glare coating film formed by the anti-glare coating composition according to the exemplary embodiment of the present invention has excellent abrasion resistance and easily removes contamination of oil components such as fingerprints or scribbles, contamination resistance such as fingerprint removability and scribble resistance is excellent, and in particular, dust removability is excellent.

The thickness of the anti-glare coating film according to the exemplary embodiment of the present invention is preferably 0.5 to 30 μm and more preferably 10 to 30 μm.

In addition, a substrate may be provided on at least one side of the anti-glare coating film according to the exemplary embodiment of the present invention.

The anti-glare coating film according to the exemplary embodiment of the present invention may be applied without limit if the film is used for the purpose of requiring both abrasion resistance and contamination resistance, and for example, the film may be applied to a display device. The anti-glare coating film may be formed by being directly coated on parts of a target device such as the display device, or may be applied to the target device together with the substrate after being formed on the substrate. The anti-glare coating film according to the exemplary embodiment of the present invention may be applied to a liquid crystal display, an organic light emitting display (OLED), and a plasma display panel (PDP), but the scope of the exemplary embodiment of the present invention is not limited thereto.

Meanwhile, a method for manufacturing an anti-glare coating film according to the exemplary embodiment of the present invention comprises coating the anti-glare coating composition according to the exemplary embodiment of the present invention on a substrate; and drying and photocuring the coated anti-glare coating composition. Needless to say, all the description in the above exemplary embodiment is applied.

Meanwhile, the display device according to the exemplary embodiment of the present invention may comprise any one display diode selected from a liquid crystal display (LCD), an organic light emitting display (OLED), and a plasma display panel (PDP), and the anti-glare coating film according to the exemplary embodiment of the present invention.

The anti-glare coating film that is formed by coating the anti-glare coating composition on the substrate may be attached to the display diode or the anti-glare coating composition may be directly coated on the display diode.

In detail, the anti-glare coating film that is formed by coating the anti-glare coating composition on the substrate may be freely attached or detached to a display such as a mobile phone window or a notebook or may be laminated on various display devices such as a polarizing plate or a PDP filter in order to provide contamination resistance and abrasion resistance.

As examples of the display device according to the exemplary embodiment of the present invention, there may be TV, a monitor for computer, a notebook, and a mobile phone comprising a display diode, but the device is not limited thereto.

In detail, the TV, the monitor for computer, and the mobile phone may comprise a display diode; and the anti-glare coating film according to the exemplary embodiment of the present invention provided on the surface of the display diode. In addition, the display diode may be supported by a main body case forming an appearance of the TV, the monitor for computer, and the mobile phone.

The notebook comprises a computer main body; and a display main body that is rotatably combined with the computer main body, and the display main body may comprise a display diode forming an image and the anti-glare coating film according to the exemplary embodiment of the present invention provided on the surface of the display diode. The display diode may be supported by the main body case forming an appearance of the display main body.

Mode for Invention

A better understanding of the present invention may be obtained in light of the following Examples which are set to illustrate, but are not to be construed to limit the present invention.

EXAMPLE

Example 1

1) Manufacturing of the Composition for the Anti-Glare Film to Which the Contamination Resistance Function was Provided The composition for the anti-glare film was manufactured by uniformly mixing 10 g of the urethane acrylate oligomer, 20 g of dipentaerythritol hexaacrylate (DPHA) as the multifunctional acrylate monomer, 10 g of perfluoro group-containing monofunctional acrylate in the structure of (Formula 1) where $X=F$, $Z=H$, $h=6$, $i=1$, and $n$ and $j=2$, and there were no residual components, 2 g of photoinitiator Igacure 907 having the surface curing characteristic, 2 g of the particulate in which the average particle diameter was 3.5 μm, the height of the unevenness formed on the surface thereof was 300 nm or less, the width of the unevenness was 1 μm or less, and the unevenness distribution was 80%, 30 g of methylethylketone as the organic solvent, 38 g of toluene, and 2 g of Igacure 184.

2) Manufacturing of the Anti-Glare Coating Film

The anti-glare coating film was manufactured by coating the liquid composition for the anti-glare film manufactured by the above method on the transparent substrate layer (thickness 80 μm) formed of triacetylcellulose by using the roll coating so that the dry thickness was 4 μm, and curing the composition by irradiating UV of 280 mJ/cm$^2$.

Example 2

The anti-glare coating film was manufactured by using the same method as Example 1, except that 5 g of perfluoro group-containing acrylate was used in Example 1 while Y and X of PFPE were F, a, g, and h were 1, and the residual was 0 in Formula 3.

Example 3

The anti-glare film was manufactured by using the composition after the composition for the anti-glare film was manufactured by using the same method as Example 1, except that the particulate in which the average particle diameter was 3.5 μm, the height of the unevenness formed on the surface thereof was 580 nm or less, and the width of the unevenness was 1.5 μm was used, instead of the particulate used in Example 1.

Example 4

The anti-glare film was manufactured by using the composition after the composition for the anti-glare film was manufactured by using the same method as Example 1, except that 10 g of perfluoro group-containing acrylate was used in Example 1 while Y and X of PFPE were F, a, g, and h were 1, and the residual was 0 in Formula 4.

Example 5

The anti-glare film was manufactured by using the composition after the composition for the anti-glare film was manufactured by using the same method as Example 1, except that perfluoro group-containing acrylate was used in Example 1 while Y and X of PFPE were F, a, g, and h were 1, and the residual was 0 in Formula 6.

Example 6

The anti-glare film was manufactured by using the composition after the composition for the anti-glare film was manufactured by using the same method as Example 1, except that 10 g of perfluoro group-containing acrylate was used in Example 1 while Y and X of PFPE were F, a, g, and h were 1, and the residual was 0 in Formula 8.

Comparative Example 1

The anti-glare film was manufactured by using the same method as Example 1, after the composition for the anti-glare film was manufactured in Example 1 with the exception of the perfluoro group-containing acrylate and the UV photoinitiator having the surface curing characteristic.

Comparative Example 2

The anti-glare film was manufactured by using the same method as Example 1, after the composition for the anti-glare film was manufactured in Example 1 by excepting photoinitiator Igacure 907 having the surface curing characteristic and increasing the content of photoinitiator Igacure 184 by the exception amount so that the final content was 4 g.

Comparative Example 3

The anti-glare film was manufactured by using the same method as Example 1, after the composition for the anti-glare film was manufactured in Example 1 by using 4 g of photoinitiator Igacure 907 having the surface curing characteristic alone with the exception of the photoinitiator Igacure 184.

Comparative Example 4

The anti-glare film was manufactured by using the composition after the composition for the anti-glare film was manufactured by using the same method as Example 1, except that the particulate in which the average particle diameter was 3.5 μm and the structure was solid, and there was no surface roughness was used instead of the particulate used in Example 1.

Comparative Example 5

The anti-glare film was manufactured by using the composition after the composition for the anti-glare film was manufactured by using the same method as Example 1, except that the amount (2 g) of the particulate used in Example 1 was decreased by 0.1 g.

Comparative Example 6

The anti-glare film was manufactured by using the composition after the composition for the anti-glare film was manu-factured by using the same method as Example 1, except that the amount (2 g) of the particulate used in Example 1 was increased to 10 g.

Experimental Example

The physical properties of the anti-glare film manufactured according to Examples 1 to 6 and Comparative Examples 1 to 6 were measured under the following conditions, and the results are described in the following Tables 1 and 2.

1) Permeability (%)

The permeability was measured by using HR-100 manufactured by Murakami Color Research Laboratory Co., Ltd.

2) Haze Value (%)

The haze value was measured by using HR-100 manufactured by Murakami Color Research Laboratory Co., Ltd.

3) 60° reflection gloss

The 60° reflection gloss was measured by using the micro-TRI-gloss manufactured by BYK Gardner Co., Ltd.

4) Distinctness-of-Image (%)

The distinctness-of-image was measured by using ICM-1T manufactured by Suga Test Instrument Co., Ltd.

5) Scratch Resistance

After steel cotton wool (#0000) was bound with the hammer of 1 kg and rubbed against the anti-glare film ten times, the scratch resistance was observed.

◎: the number of scratch: 0

○: the number of scratch: 5 thin scratches or less, the scratch having the diameter of 1 cm or less Δ: the number of scratch: more than 5 thin scratches, the scratch having the diameter of 1 cm or less, or 1 to 3 long scratches, the scratch having the diameter of 1 cm or more ×: the number of scratch: more than 3 long scratches, the scratch having the diameter of 1 cm or more 6) Pencil Hardness The pencil hardness was measured by the method specified in JIS K 5400 with the load of 500 g.

7) Water Contact Angle

The contact angle in respect to water was measured by the surface energy measuring device DSA10 manufactured by Kruss Co., Ltd.

8) Surface Energy

The surface energy was evaluated by measuring the contact angle between water and diiodomethane by the surface energy measuring device DSA10 manufactured by Kruss Co., Ltd.

9) Scribble Removability

After two lines having the length of about 5 cm were drawn with the oil-based pen on the coated film, the film was rubbed with ultrafine dustless clothes, and it was confirmed by the naked eye whether the pen mark remained. This was repeated until the pen mark was observed, and the number of repeating process was recorded. The evaluation was performed on the basis of 100 times or more repeating processes.

10) Fingerprint Removability

The artificial finger print solution was manufactured, and the finger print solution was applied to the rubber stamp. Thereafter, the rubber stamp was stamped on the surface of the coated film, and dried for 10 min. After the drying, the fingerprint was removed by the gaze towel, and the residual mark was evaluated by the naked eye. In this case, the used artificial fingerprint solution was prepared on the basis of JIS K 2246.

TABLE 1

| Classification | Example 1 | Example 2 | Example 3 | Example 4 | Example 5 | Example 6 |
|---|---|---|---|---|---|---|
| Permeability (%) | 93.9 | 93.9 | 93.5 | 93.5 | 93.6 | 93.6 |
| Haze value (%) | 10.1 | 10.1 | 9.8 | 10.1 | 10.0 | 10.0 |
| 60° reflection gloss (Gloss) | 80 | 80 | 75 | 80 | 78 | 78 |
| Distinctness-of-image (%) | 292 | 292 | 210 | 292 | 290 | 292 |
| Contrast Light room | 210 | 213 | 223 | 210 | 213 | 213 |
| Dark room | 533 | 530 | 521 | 530 | 520 | 530 |
| Scratch resistance | ⊚ | ⊚ | ⊚ | ⊚ | ⊚ | ⊚ |
| Hardness | 2H | 2H | 2H | 2H | 2H | 2H |
| Water contact angle (°) | 109 | 104 | 105 | 104 | 104 | 104 |
| Surface energy (mN/m) | 12.75 | 13.2 | 13.5 | 13.2 | 13.2 | 13.3 |
| Scribble removability | >100 times | >100 times | >100 times | >100 times | >100 times | >100 times |
| Fingerprint removability | good | good | good | good | good | good |

TABLE 2

| Classification | Comparative Example 1 | Comparative Example 2 | Comparative Example 3 | Comparative Example 4 | Comparative Example 5 | Comparative Example 6 |
|---|---|---|---|---|---|---|
| Permeability (%) | 93.9 | 93.9 | 93.9 | 93.9 | 94.1 | 92.8 |
| Haze value (%) | 10.1 | 10.1 | 10.1 | 10.1 | 0.2 | 48 |
| 60° reflection gloss (Gloss) | 80 | 80 | 80 | 110 | 135 | 25 |
| Distinctness-of-image (%) | 292 | 292 | 292 | 150 | 390 | 32 |
| Contrast Light room | 210 | 213 | 213 | 350 | 180 | 180 |
| Dark room | 533 | 530 | 520 | 550 | 523 | 523 |
| Scratch resistance | X | Δ | ⊚ | ⊚ | ⊚ | X |
| Hardness | 2H | 2H | H | 2H | 2H | H |
| Water contact angle (°) | 68 | 104 | 105 | 104 | 105 | 110 |
| Surface energy (mN/m) | 35.36 | 13.2 | 13.5 | 13.2 | 13.5 | 12.2 |
| Scribble removability | <5 times | <20 times | >100 times | >100 times | >100 times | >100 times |
| Fingerprint removability | poor | good | good | good | good | good |

As shown in Tables 1 and 2, Examples 1 to 6 using the perfluoro group-containing acrylate and the UV photoinitiator having the surface curing characteristic had the contamination resistance characteristic in which the surface energy was 15 or less and good fingerprint removability, unlike Comparative Example 1 not comprising the perfluoro group. In addition, since removability of the oily scribble is excellent, the repeated scribble removability of the oil-based pen (name pen) is 100 times or more.

In the case of Comparative Example 1, the anti-glare characteristic is excellent because of using the particle of which the surface has the uneven pattern, but since there is no perfluoro group-containing acrylate, surface energy is high, and the written scribble is not removed, such that the contamination resistance characteristic is not shown. In addition, since the surface curable initiator is excluded, the scratch resistance characteristic is also decreased.

Comparative Examples 2 and 3 are the case where only one photoinitiator is used. In Comparative Example 2, in the case where Igacure 184 is used alone, the hardness is good but the degree of curing of the surface is low, such that a scratch property is decreased, and there is a characteristic where scribble removability is poor because oily ink permeates.

In Comparative Example 3, in the case where Igacure 907 is used alone, it can be seen that because of the surface curing, scratch and scribble removability are good but the total degree of curing is poor, such that the hardness is decreased.

In the case of Examples 1 to 6 and Comparative Example 1 using the particulate of which the surface has the uneven pattern, it can be seen that the anti-glare characteristic, the distinctness-of-image, and the contrast are excellent.

Meanwhile, in the case of Comparative Example 4 using the particulate having no surface roughness, it can be seen that the 60° reflection gloss is 110 and the anti-glare characteristic of the coating film is decreased.

In addition, in the case of Comparative Example 5 where the particulate having the surface roughness is less than 1 part by weight, the haze value is very low and the 60° reflection gloss is 135, which shows that the anti-glare characteristic of the coating film is very poor, and in the case of Comparative Example 6 where the particulate having the surface roughness is more than 30 parts by weight, it can be seen that there is the anti-glare characteristic but the distinctness-of-image is very low. In addition, since the content of particles is high, the degree of crosslinking of the film is decreased, such that it can be seen that the scratch resistance and hardness are decreased.

Optimum examples of the present invention were described. Herein, specific terms have been used, but are just used for the purpose of describing the present invention and are not used for defining the meaning or limiting the scope of the present invention, which is disclosed in the appended claims.

The invention claimed is:

1. An anti-glare coating composition, comprising:
   a) a binder resin;
   b) a fluorine-based UV curable functional group-containing compound;
   c) a photoinitiator;
   d) a surface curable photoinitiator; and
   e) a particulate having a surface, the surface having an uneven pattern,
   wherein the particulate has an average surface roughness ([Rz]) of 0.1 to 2 μm,
   the content of c) the photoinitiator on the basis of 100 parts by weight of a) the binder resin is 1 to 20 parts by weight,
   the content of d) the surface curable photoinitiator on the basis of 100 parts by weight of b) the fluorine-based UV curable functional group-containing compound is 5 to 40 parts by weight,
   an average particle diameter of the particulate is 1 to 10 μm,
   the content of e) the particulate of a surface having the uneven pattern on the basis of 100 parts by weight of a) the binder resin is 0.5 to 50 parts by weight, and
   b) the fluorine-based UV curable functional group-containing compound comprises one or more selected from the compounds that are represented by the following Formulas 1 to 9:

[Formula 1]

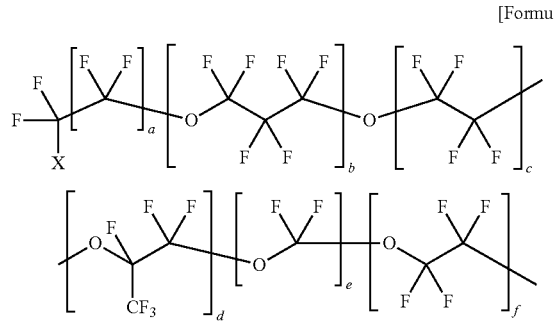

[Formula 2]

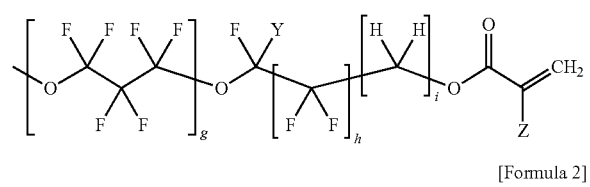

[Formula 3]

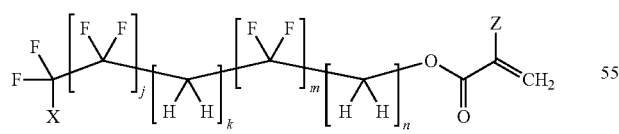

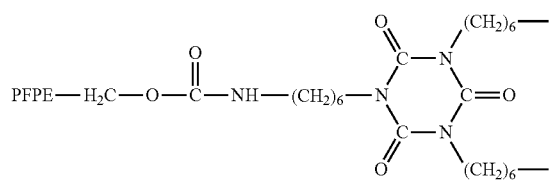

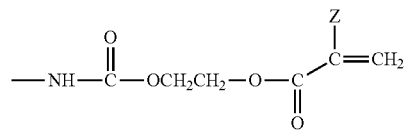

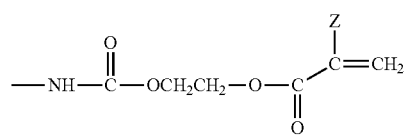

[Formula 4]

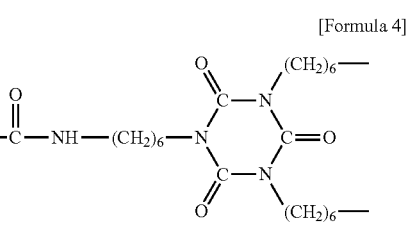

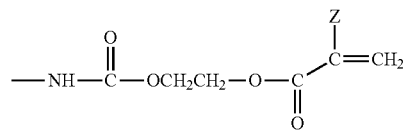

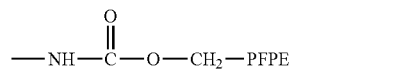

[Formula 5]

PFPE—H₂C—O—C(=O)—N(H)—(H₂C)₆—C(=O)—N(—(CH₂)₆—)
H₂C=C(H)—C(=O)—O—H₂CH₂CO—C(H₂)—(H₂C)₆—C(=O)
—C(=O)—OCH₂CH₂—O—C(Z)=CH₂

[Formula 6]

PFPE-H₂C—O—C(=O)—N(H)—CH₂—[cyclohexane with CH₃ groups]—N(—)—C(=O)—N—C(=O)—N—[cyclohexane with CH₃ groups]—CH₂—N(H)—
H₂C=C(Z)—C(=O)—O—H₂CH₂CO—C(=O)—N(H)—CH₂—
—C(=O)—OCH₂CH₂—O—C(Z)=CH₂

-continued

[Formula 7]

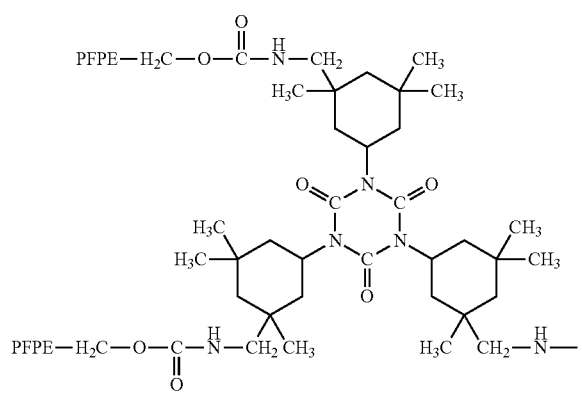

[Formula 8]

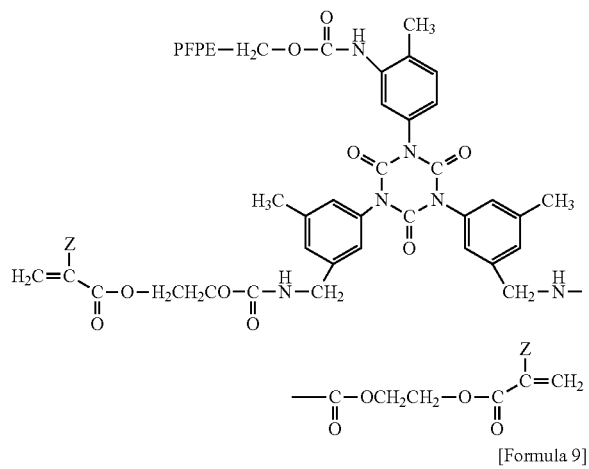

[Formula 9]

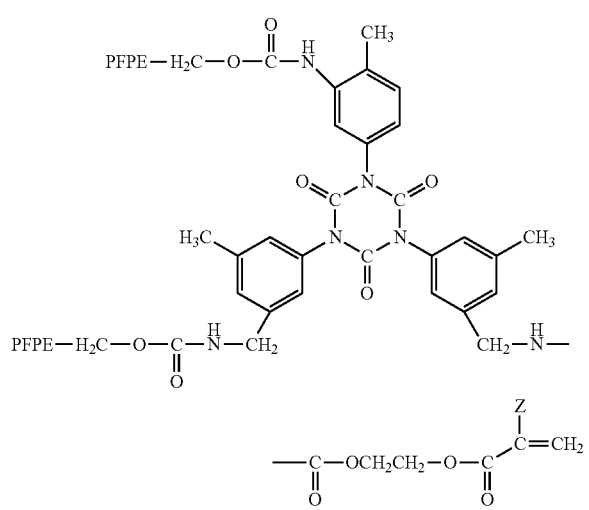

in Formulas 1 to 9, X and Y are each independently F or $CF_3$, Z is H or $CH_3$, a, j and m are each an integer of 1 to 16, c, k and n are each an integer of 0 to 5, b, d, e, f and g are each an integer of 0 to 200, h and i are each an integer of 0 to 16, and PFPE has the following structures,

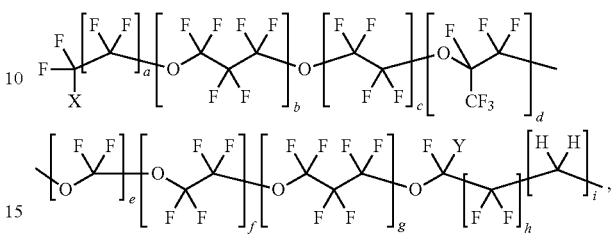

wherein a to i, X and Y are the same as the definitions of Formula 1.

2. The anti-glare coating composition according to claim 1, wherein the content of b) the fluorine-based UV curable functional group-containing compound on the basis of 100 parts by weight of a) the binder resin is 1 to 50 parts by weight.

3. The anti-glare coating composition according to claim 1, wherein a) the binder resin comprises a UV curable functional group-containing binder resin.

4. The anti-glare coating composition according to claim 1, wherein b) the fluorine-based UV curable functional group-containing compound comprises one or more selected from acrylates, methacrylates, and vinyls comprising a perfluoro group.

5. The anti-glare coating composition according to claim 1, wherein d) the surface curable photoinitiator comprises an alpha-hydroxyketone compound.

6. An anti-glare coating film, comprising:
the anti-glare coating composition according to claim 1.

7. The anti-glare coating film according to claim 6, wherein a thickness is 0.5 to 300 μm.

8. The anti-glare coating film according to claim 6, wherein a substrate is provided on at least one side thereof.

9. A method for manufacturing an anti-glare coating film, comprising:
coating the anti-glare coating composition according to claim 1 on a substrate; and
drying and photocuring the coated anti-glare coating composition.

10. The method for manufacturing an anti-glare coating film according to claim 9, wherein a coating thickness of the anti-glare coating composition is 0.5 to 300 μm.

11. A display device, comprising:
an anti-glare coating film according to claim 6.

12. The display device according to claim 11, wherein the display device comprises any one of a liquid crystal display (LCD), an organic light emitting display (OLED), and a plasma display panel (PDP).

* * * * *